United States Patent
Gotou et al.

(10) Patent No.: US 12,173,220 B2
(45) Date of Patent: Dec. 24, 2024

(54) HEAT TRANSFER COMPOSITION

(71) Applicant: DAIKIN INDUSTRIES, LTD., Osaka (JP)

(72) Inventors: Tomoyuki Gotou, Osaka (JP); Yuuki Yotsumoto, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 708 days.

(21) Appl. No.: 17/299,599

(22) PCT Filed: Nov. 21, 2019

(86) PCT No.: PCT/JP2019/045679
§ 371 (c)(1),
(2) Date: Jun. 3, 2021

(87) PCT Pub. No.: WO2020/116189
PCT Pub. Date: Jun. 11, 2020

(65) Prior Publication Data
US 2022/0017799 A1    Jan. 20, 2022

(30) Foreign Application Priority Data
Dec. 5, 2018 (JP) ................................ 2018-228082

(51) Int. Cl.
*C09K 5/04* (2006.01)
*C09K 5/10* (2006.01)
*F25B 49/02* (2006.01)

(52) U.S. Cl.
CPC ............... *C09K 5/044* (2013.01); *C09K 5/10* (2013.01); *F25B 49/02* (2013.01)

(58) Field of Classification Search
CPC . C09K 5/44; C09K 5/045; C09K 5/10; C09K 5/20; C09K 2205/128; C09K 2205/40; F25B 49/02
See application file for complete search history.

(56) References Cited

U.S. PATENT DOCUMENTS

| | | | | |
|---|---|---|---|---|
| 5,611,210 A | * | 3/1997 | Nimitz | C09K 3/30 252/2 |
| 2005/0233923 A1 | * | 10/2005 | Singh | C08J 9/144 510/177 |
| 2010/0044620 A1 | * | 2/2010 | Rached | C07C 19/16 252/67 |
| 2016/0347980 A1 | | 12/2016 | Okamoto | |

FOREIGN PATENT DOCUMENTS

| | | |
|---|---|---|
| JP | 2005-225906 | 8/2005 |
| JP | 2011-510119 | 3/2011 |
| JP | 2016-176080 | 10/2016 |
| WO | 99/41325 | 8/1999 |
| WO | 2006/069362 | 6/2006 |
| WO | 2009/089511 | 7/2009 |
| WO | 2016/002523 | 1/2016 |

OTHER PUBLICATIONS

International Search Report issued Dec. 17, 2019 in International (PCT) Application No. PCT/JP2019/045679.
Extended European Search Report issued Aug. 19, 2022 in corresponding European Patent Application No. 19892642.0.

* cited by examiner

*Primary Examiner* — Jane L Stanley
(74) *Attorney, Agent, or Firm* — Wenderoth, Lind & Ponack, L.L.P.

(57) ABSTRACT

Provided is a heat transfer composition comprising at least one iodocarbon compound and a refrigeration oil, and having a turbidity of 100 degrees or less as measured in accordance with JIS K0101 after stability testing. Also provided is a heat transfer composition comprising at least one iodocarbon compound and a refrigeration oil in which no hydrogen atom is bonded to a carbon atom or silicon atom in a main chain skeleton. These heat transfer compositions have significantly improved stability and are prevented from discoloration due to deterioration over time.

9 Claims, No Drawings

HEAT TRANSFER COMPOSITION

TECHNICAL FIELD

The present disclosure relates to a heat transfer composition.

BACKGROUND ART

Air-conditioning refrigerants for residential air conditioners etc. are required to have a low global warming potential (GWP), non-flammability, and low toxicity. For example, iodocarbon compounds, such as trifluoroiodomethane, are used as such refrigerants.

However, heat transfer compositions using iodocarbon compounds (particularly compositions comprising a refrigerant) have problems in stability. In order to improve the stability of such heat transfer compositions, for example, PTL 1 discloses a heat transfer composition comprising an iodocarbon compound and a diene-based compound.

CITATION LIST

Patent Literature

PTL 1: JP2016-176080A

SUMMARY OF INVENTION

Technical Problem

An object of the present disclosure is to provide a heat transfer composition with improved stability.

Solution to Problem

The present disclosure includes the following configurations.

Item 1. A heat transfer composition comprising at least one iodocarbon compound and a refrigeration oil, and having a turbidity of 100 degrees or less as measured in accordance with JIS K0101 after stability testing.

Item 2. A heat transfer composition comprising at least one iodocarbon compound and a refrigeration oil in which no hydrogen atom is bonded to a carbon atom or silicon atom in a main chain skeleton.

Item 3. The heat transfer composition according to Item 1 or 2, wherein the refrigeration oil comprises a fluorine oil that does not have a structure represented by —$CH_2$—$CH_2$—.

Item 4. The heat transfer composition according to Item 3, wherein the fluorine oil contains fluorine atoms in an amount of 50 mol % or more based on the total amount of fluorine atoms and hydrogen atoms in the fluorine oil, which is taken as 100 mol %.

Item 5. The heat transfer composition according to Item 3 or 4, wherein in the fluorine oil, no hydrogen atom is bonded to a carbon atom at a main chain terminal.

Item 6. The heat transfer composition according to any one of Items 1 to 5, wherein the refrigeration oil comprises a silicone oil having a —Si—O— skeleton in its main chain.

Item 7. The heat transfer composition according to any one of Items 1 to 6, wherein the at least one iodocarbon compound comprises at least one iodofluorocarbon compound.

Item 8. The heat transfer composition according to Item 7, wherein the at least one iodofluorocarbon compound comprises at least one $C_{1-3}$ iodofluorocarbon compound.

Item 9. The heat transfer composition according to Item 8, wherein the at least one $C_{1-3}$ iodofluorocarbon compound comprises trifluoroiodomethane.

Item 10. The heat transfer composition according to any one of Items 1 to 9, wherein the refrigeration oil is contained in an amount of 10 to 50 mass % based on the total amount of the heat transfer composition, which is taken as 100 mass %.

Item 11. The heat transfer composition according to any one of Items 1 to 10 for use as a working fluid for a refrigerating machine.

Item 12. A working fluid for a refrigerating machine comprising the heat transfer composition according to any one of Items 1 to 11.

Item 13. A refrigerating machine comprising the heat transfer composition according to any one of Items 1 to 11 or the working fluid for a refrigerating machine according to Item 12 as a working fluid.

Item 14. A method for operating a refrigerating machine, comprising circulating the heat transfer composition according to any one of Items 1 to 11 or the working fluid for a refrigerating machine according to Item 12 as a working fluid in a refrigerating machine.

Item 15. A refrigeration oil for suppressing discoloration of a heat transfer composition comprising an iodocarbon compound, the refrigeration oil comprising an oil in which no hydrogen atom is bonded to a carbon atom or silicon atom in a main chain skeleton.

Item 16. A stabilizer for a heat transfer composition comprising an iodocarbon compound, the stabilizer comprising a fluorine oil in which no hydrogen atom is bonded to a carbon atom in a main chain skeleton.

Advantageous Effects of Invention

The heat transfer composition of the present disclosure has improved stability.

DESCRIPTION OF EMBODIMENTS

Heat transfer compositions using iodocarbon compounds (particularly compositions comprising a refrigerant) have problems in stability. In order to improve their stability, an attempt is generally made to add stabilizers. However, even if a stabilizer is added, the refrigeration oil used together in the heat transfer composition deteriorates over time, and the iodine produced as a decomposition product and the conjugated bond generated by the reaction discolor the refrigeration oil; thus, the addition of stabilizers is not significantly effective. The coloring of the refrigeration oil is caused by the absorption of light due to structural changes or by the scattering of light due to the formation of fine particles, which can cause clogging in piping.

The present inventors conducted intensive studies to solve the above problem, and consequently found that a heat transfer composition comprising at least one iodocarbon compound and a refrigeration oil, and having a turbidity of 100 degrees or less as measured in accordance with JIS K0101 after stability testing, has significantly improved stability and is prevented from discoloration due to deterioration over time. Further, the present inventors conducted intensive studies to solve the above problem, and consequently found that a heat transfer composition comprising at least one iodocarbon compound and a refrigeration oil in which no hydrogen atom is bonded to a carbon atom or silicon atom in a main chain skeleton also has significantly improved stability and is prevented from discoloration due to deterioration over time.

The present disclosure has been completed as a result of further research based on these findings. The present disclosure includes the following embodiments.

DEFINITION OF TERMS

In the present disclosure, the term "iodocarbon compound" refers to any compound containing at least one carbon-iodine bond, and includes iodofluorocarbon compounds (compounds that have at least one carbon-iodine bond and at least one carbon-fluorine bond, but do not have other bonds except for carbon-carbon bonds) and hydroiodofluorocarbon compounds (compounds that have at least one carbon-iodine bond, at least one carbon-fluorine bond, and at least one carbon-hydrogen bond, but do not have other bonds except for carbon-carbon bonds).

In the present disclosure, the term "heat transfer composition" can be generally adapted for heat transfer applications, that is, for use as a heating and/or cooling medium. Typical examples include compositions comprising a refrigerant.

In the present disclosure, the term "refrigerant" includes at least compounds that are specified in ISO817 (International Organization for Standardization), and that are given a refrigerant number (ASHRAE number) representing the type of refrigerant with "R" at the beginning; and further includes refrigerants that have characteristics equivalent to those of such refrigerants even if a refrigerant number is not yet given. Refrigerants are broadly divided into fluorocarbon-based compounds and non-fluorocarbon-based compounds in terms of the structure of the compounds. Fluorocarbon-based compounds include chlorofluorocarbons (CFC), hydrochlorofluorocarbons (HCFC), hydrofluorocarbons (HFC), and hydrofluoroolefins (HFO). Non-fluorocarbon-based compounds include propane (R290), propylene (R1270), butane (R600), isobutane (R600a), carbon dioxide (R744), ammonia (R717), and the like.

The term "composition comprising a refrigerant" used in the present disclosure at least includes:

(1) a refrigerant itself (including a mixture of refrigerants, i.e., refrigerant mixture);
(2) a composition that can be used for obtaining a working fluid for a refrigerating machine by further comprising one or more other components and mixing with a refrigeration oil; and
(3) a working fluid for a refrigerating machine (refrigeration working fluid), containing a refrigeration oil. Among these three modes, composition (2) is also referred to as a "refrigerant composition" in the present specification to distinguish it from a refrigerant itself (including a refrigerant mixture). Further, the heat transfer composition of the present disclosure corresponds to the working fluid for a refrigerating machine (3), and is also referred to as "a refrigeration oil-containing working fluid (working fluid containing refrigeration oil)" to distinguish it from the "refrigerant composition."

In the present disclosure, when the term "alternative" is used in a context in which the first refrigerant is replaced with the second refrigerant, the first type of alternative means that equipment designed for operation using the first refrigerant can be operated using the second refrigerant under optimum conditions, optionally with changes of only a few parts (at least one of the following: refrigeration oil, gasket, packing, expansion valve, dryer, other parts) and equipment adjustment. In other words, this type of alternative means that the same equipment is operated with an alternative refrigerant. Embodiments of this type of alternative include drop-in alternatives, nearly drop-in alternatives, and retrofits, in the order in which the extent of changes and adjustment necessary for replacing the first refrigerant with the second refrigerant is smaller.

The term "alternative" also includes a second type of alternative, which means that equipment designed for operation using the second refrigerant is operated for the same use as the existing use with the first refrigerant by using the second refrigerant. This type of alternative means that the same use is achieved with an alternative refrigerant.

In the present disclosure, the term "refrigerating machine (refrigerator)" refers to apparatuses in general that draw heat from an object or space to make its temperature lower than the temperature of the ambient air, and maintain the low temperature. In other words, refrigerating machines refer to conversion apparatuses that gain energy from the outside to do work, and that perform energy conversion, in order to transfer heat from where the temperature is lower to where the temperature is higher.

1. Heat Transfer Composition

The heat transfer compositions of the present disclosure can be roughly classified into Embodiments 1 and 2 (also referred to as the "heat transfer composition 1" and the "heat transfer composition 2," respectively). The heat transfer compositions 1 and 2 both have significantly excellent stability and are prevented from discoloration due to deterioration over time. Therefore, the heat transfer compositions 1 and 2 of the present disclosure and compositions comprising them are useful, for examples, as working fluids for refrigerating machines. The heat transfer compositions 1 and 2 are described below.

(1-1) Embodiment 1: Heat Transfer Composition 1

The heat transfer composition 1 of the present disclosure comprises at least one iodocarbon compound and a refrigeration oil, and has a turbidity of 100 degrees or less as measured in accordance with JIS K0101 after stability testing. That is, the heat transfer composition 1 of the present disclosure comprises a refrigerant and a refrigeration oil, wherein the refrigerant may be at least one iodocarbon compound. The heat transfer composition 1 of the present disclosure is suitable for commercial, industrial, and personal use, particularly as a heat transfer fluid for use in refrigeration systems and air-conditioning systems (including automobile air-conditioning systems), and can be used, for example, as a working fluid in a refrigerating machine. Specifically, the heat transfer composition 1 of the present disclosure can be obtained by mixing together a refrigerant or a refrigerant composition with a refrigeration oil used in a compressor of a refrigerating machine. Further, this composition is extremely stable in various applications and can be prevented from discoloration due to deterioration over time. In addition, this composition is non-flammable and tends to have a low global warming potential. This composition can be a particularly useful candidate as an alternative to CFC, HCFC, and HFC refrigerants.

Refrigerant

The refrigerant contained in the heat transfer composition 1 of the present disclosure comprises at least one iodocarbon compound, as described above.

As the iodocarbon compound, in the present disclosure, an iodocarbon compound with poor stability is used in combination with a refrigeration oil, and the turbidity is set to 100 degrees or less as measured in accordance with JIS K0101 after stability testing, thereby significantly improving stability and preventing discoloration due to deterioration over time. For this reason, the refrigerant component that has poor stability, a low global warming potential, and excellent non-flammability is preferably an iodofluorocarbon compound, more preferably a $C_{1-3}$ iodofluorocarbon compound, and most preferably trifluoroiodomethane ($CF_3I$).

Thus, the heat transfer composition 1 of the present disclosure comprises at least one iodocarbon compound as a refrigerant component, and may contain, if necessary, optional components, described later, in addition to the iodocarbon compound. The content of the iodocarbon compound is preferably 25 mass % or more, and more preferably 30 mass % or more, based on the entire refrigerant.

Optional Components

The heat transfer composition 1 of the present disclosure may optionally contain compounds generally used as heat transfer compositions, other than iodocarbon compounds, within a range in which the effects of the present disclosure are not impaired. Examples of such compounds include HFCs (particularly $C_{1-5}$ HFCs) and HFOs (particularly $C_{2-5}$ HFOs).

Examples of HFCs include difluoromethane (HFC-32), difluoroethane (e.g., 1,1-difluoroethane (HFC-152a) and 1,2-difluoroethane (HFC-152)), trifluoroethane (e.g., 1,1,1-trifluoroethane (HFC-143a) and 1,1,2-trifluoroethane (HFC-143)), tetrafluoroethane (e.g., 1,1,2,2-tetrafluoroethane (HFC-134) and 1,1,1,2-tetrafluoroethane (HFC-134a)), pentafluoroethane (HFC-125), pentafluoropropane (e.g., 1,1,1,3,3-pentafluoropropane (HFC-245fa)), hexafluoropropane (e.g., 1,1,1,3,3,3-hexafluoropropane (HFC-236fa) and 1,1,1,2,3,3-hexafluoropropane (HFC-236ea)), heptafluoropropane (1,1,1,2,3,3,3-heptafluoropropane (HFC-227ea)), pentafluorobutane, heptafluorocyclopentane, and the like. Of these, preferable as HFCs are HFC-32, HFC-152a, HFC-143a, HFC-134, HFC-134a, HFC-125, etc., and more preferable are HFC-32, HFC-152a, HFC-134a, HFC-125, etc., because they have little effect on the ozone layer and excellent refrigeration cycle characteristics. HFCs can be used singly or in combination of two or more.

Examples of HFOs include 2,3,3,3-tetrafluoropropene (HFO-1234yf), trans-1,2-difluoroethylene (HFO-1132(E)), cis-1,2-difluoroethylene (HFO-1132(Z)), trifluoroethylene (HFO-1123), 2-fluoropropene (HFO-1261yf), 1,1,2-trifluoropropene (HFO-1243yc), trans-1,2,3,3,3-pentafluoropropene (HFO-1225ye(E)), cis-1,2,3,3,3-pentafluoropropene (HFO-1225ye(Z)), trans-1,3,3,3-tetrafluoropropene (HFO-1234ze(E)), cis-1,3,3,3-tetrafluoropropene (HFO-1234ze(Z)), 3,3,3-trifluoropropene (HFO-1243zf), and the like.

In addition to the above optional components, as components that can be contained in a composition used to obtain a working fluid for a refrigerating machine generally by mixing them with a refrigeration oil, the heat transfer composition 1 of the present disclosure may also contain at least one member selected from the group consisting of water, tracers (e.g., FC-14 ($CF_4$), HCC-40 ($CH_3Cl$), HFC-23 ($CHF_3$), HFC-41 ($CH_3Cl$), HFC-161 ($CH_3CH_2F$), HCFC-22 ($CHClF_2$), HCFC-31 ($CH_2ClF$), CFC-1113 ($CF_2=CClF$), HFE-125 ($CF_3OCHF_2$), HFE-134a ($CF_3OCH_2F$), HFE-143a ($CF_3OCH_3$), HFE-227ea ($CF_3OCHFCF_3$), and HFE-236fa ($CF_3OCH_2CF_3$)), ultraviolet fluorescent dyes (e.g., naphthalimide, coumarin, anthracene, phenanthrene, xanthene, thioxanthene, naphthoxanthene, fluorescein, and derivatives thereof), stabilizers (e.g., nitromethane, nitroethane, nitrobenzene, nitrostyrene, 1,4-dioxane, 2,2,3,3,3-pentafluoropropylamine, diphenylamine, butylhydroxyxylene, and benzotriazole), polymerization inhibitors (e.g., 4-methoxy-1-naphthol, hydroquinone, hydroquinone methyl ether, dimethyl-t-butylphenol, 2,6-di-tert-butyl-p-cresol, and benzotriazole), and the like. Such various components can be contained in an amount of 0 to 1 mass %, and preferably 1 ppm by mass to 0.1 mass %, based on the total amount of the refrigerant component described above and these other components.

Refrigeration Oil

The base oil of the refrigeration oil used in the present disclosure is not limited; however, when a double bond is introduced into the main chain skeleton by the reaction with the iodocarbon compound, the refrigeration oil becomes discolored, and the flowability is reduced. It is thus preferable that no hydrogen atom is bonded to a carbon atom or silicon atom in the main chain skeleton.

As such a base oil, it is preferable to use, for example, a fluorine oil that does not have a structure represented by —$CH_2$—$CH_2$—, particularly a fluorine oil in which no hydrogen atom is bound to carbon atoms not only in the main chain skeleton but also at the main chain terminal. The use of such a fluorine oil can significantly improve stability, prevent discoloration due to deterioration over time to maintain flowability, and suppress the reaction with the iodocarbon compound contained in the refrigerant to prevent the formation of co-refrigerants, such as $CHF_3$(R23), as by-products, thereby improving the stability of the iodocarbon compound, and consequently significantly improving the stability of the entire heat transfer composition.

This fluorine oil preferably contains fluorine atoms in an amount of 50 mol % or more, and more preferably 70 mol % or more, based on the total amount of fluorine atoms and hydrogen atoms, which is taken as 100 mol %, from the standpoint of significantly improving stability, preventing discoloration due to deterioration over time to maintain flowability, and suppressing the reaction with the iodocarbon compound contained in the refrigerant to prevent the formation of co-refrigerants, such as $CHF_3$ (R23), as by-products. It is also possible to set the fluoride atom content to 100 mol %.

Examples of fluorine oils that satisfy such conditions include a fluorine oil represented by formula (1):

$$R^2-(O-R^1)_n-R^3 \quad (1)$$

wherein $R^1$ is a fluorine-containing alkylene group, $R^2$ and $R^3$ are (fluoro)alkyl groups, and n is an integer of 1 to 500.

The fluorine-containing alkylene group represented by $R^1$ is preferably a perfluoroalkylene group, and more preferably a $C_{1-6}$ perfluoroalkylene group, from the standpoint of significantly improving stability, preventing discoloration due to deterioration over time to maintain flowability, and suppressing the reaction with the iodocarbon compound contained in the refrigerant to prevent the formation of co-refrigerants, such as $CHF_3$ (R23), as by-products.

Examples of such a fluorine-containing alkylene group include —($OCX_2$)—, —($OC_2X_4$)—, —($OC_3X_6$)—, —($OC_4X_8$)—, and the like. In the formulas, X are the same or different and each is a hydrogen atom or a fluorine atom. Further, it is preferable that 50% or more, preferably 70% or more, and more preferably 100%, of the total number of X contained in the fluorine oil is fluorine atoms. —(OC$_2$X$_4$)— may be any of —(OCX$_2$CX$_2$)— and —(OCX(CX$_3$))—; —(OC$_3$X$_6$)— may be any of —(OCX$_2$CX$_2$CX$_2$)—, —(OCX(CX$_3$)CX$_2$)—, and —(OCX$_2$CX(CX$_3$))—; and —(OC$_4$X$_8$)— may be any of —(OCX$_2$CX$_2$CX$_2$CX$_2$)—, —(OCX(CX$_3$)CX$_2$CX$_2$)—, —(OCX$_2$CX(CX$_3$)CX$_2$)—, —(OCX$_2$CX$_2$CX(CX$_3$))—, —(OC(CX$_3$)$_2$CX$_2$)—, —(OCX$_2$C(CX$_3$)$_2$)—, —(OCX(CX$_3$)CX(CX$_3$))—, —(OCX(C$_2$X$_5$)CX$_2$)—, and —(OCX$_2$CX(C$_2$X$_5$)).

The (fluoro)alkyl groups represented by R$^2$ and R$^3$ refer to alkyl groups or fluoroalkyl groups. That is, R$^2$ and R$^3$ are alkyl groups optionally substituted with one or more fluoride atoms, and preferably C$_{1-16}$ alkyl groups optionally substituted with one or more fluoride atoms (particularly C$_{1-16}$ perfluoroalkyl groups). Further, R$^2$ and R$^3$ are more preferably each independently a C$_{1-3}$ perfluoroalkyl group.

In formula (1), n, which indicates the degree of polymerization, is not limited; however, from the standpoint of significantly improving stability, preventing discoloration due to deterioration over time to maintain flowability, and suppressing the reaction with the iodocarbon compound contained in the refrigerant to prevent the formation of co-refrigerants, such as CHF$_3$ (R23), as by-products, n is preferably an integer of 1 to 500, and more preferably an integer of 10 to 200.

Examples of fluorine oils that satisfy the above conditions include Daifloil #1, Daifloil #3, Daifloil #10, Daifloil #20, Daifloil #50, Daifloil #100, Demnum S-65, Daifloil Grease DG-203, Demnum L65, Demnum L100, and Demnum L200 (all of which are produced by Daikin Industries, Ltd.); Krytox (registered trademark) Grease 240AC (produced by DuPont); Sumitec F936 (produced by Sumico Lubricant Co., Ltd.); Molykote (registered trademark) HP-300, Molykote (registered trademark) HP-500, Molykote (registered trademark) HP-870, and Molykote (registered trademark) 6169 (all of which are produced by Toray Dow Corning Co., Ltd.); and the like. These fluorine oils can be used singly or in combination of two or more.

In addition, as the base oil of the refrigeration oil, a silicone oil having a —Si—O— skeleton in the main chain can also be preferably used. The use of such a silicone oil can improve stability and prevent discoloration due to deterioration over time to maintain flowability.

Examples of silicone oils that satisfy such conditions include a silicone oil represented by formula (2):

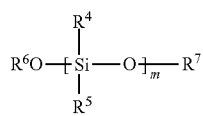

(2)

wherein R$^4$ and R$^5$ are the same or different and each is a hydrocarbon group, R$^6$ and R$^7$ are the same or different and each is a hydrogen atom or a hydrocarbon group, and m is an integer of 1 to 2000.

The hydrocarbon groups represented by R$^4$ to R$^7$ are preferably C$_{1-18}$ hydrocarbon groups, from the standpoint of significantly improving stability, preventing discoloration due to deterioration over time to maintain flowability, and suppressing the reaction with the iodocarbon compound contained in the refrigerant to prevent the formation of co-refrigerants, such as CHF$_3$ (R23), as by-products.

Examples of such hydrocarbon groups include C$_{1-18}$ alkyl groups, such as methyl, ethyl, propyl, butyl, pentyl, hexyl, heptyl, octyl, nonyl, decyl, dodecyl, tridecyl, tetradecyl, hexadecyl, and octadecyl; C$_{3-18}$ cycloalkyl groups, such as cyclohexyl; C$_{2-18}$ alkenyl groups, such as vinyl and allyl; C$_{6-18}$ aryl groups, such as phenyl and tolyl; C$_{7-18}$ aralkyl groups, such as styryl and α-methylstyryl; chloromethyl, 3-chloropropyl, 3,3,3-trifluoropropyl, cyanoethyl, 3-aminopropyl, and N-(β-aminoethyl)-γ-aminopropyl, in which some or all of hydrogen atoms bonded to the carbon atoms of the above groups are replaced with halogen atoms (fluorine, chlorine, bromine, or iodine), cyano groups, amino groups, hydroxyl groups, etc.; and the like. In particular, it is preferable that 80% or more, and particularly 90% or more, of the total number of R$^4$ to R$^7$ is methyl groups. The end of the silicone oil may be sealed with a triorganosilyl group or a diorganohydroxysilyl group.

In formula (2), m, which indicates the degree of polymerization, is not limited; however, from the standpoint of significantly improving stability, preventing discoloration due to deterioration over time to maintain flowability, and suppressing the reaction with the iodocarbon compound contained in the refrigerant to prevent the formation of co-refrigerants, such as CHF$_3$ (R23), as by-products, n is preferably an integer of 1 to 2000, and more preferably an integer of 1 to 1000.

Examples of silicone oils that satisfy the above conditions include the product name ASO-100 (produced by AS ONE Corporation); the product names Shin-Etsu Silicone KF-96, Shin-Etsu Silicone KF-965, Shin-Etsu Silicone KF-968, Shin-Etsu Silicone KF-99, Shin-Etsu Silicone KF-50, Shin-Etsu Silicone KF-54, Shin-Etsu Silicone HIVAC F-4, Shin-Etsu Silicone HIVAC F-5, Shin-Etsu Silicone KF-56A, and Shin-Etsu Silicone KF-995, the product names Shin-Etsu Silicone G-30 series, Shin-Etsu Silicone G-40 series, Shin-Etsu Silicone FG-720 series, Shin-Etsu Silicone G-411, Shin-Etsu Silicone G-501, Shin-Etsu Silicone G-6500, Shin-Etsu Silicone G-330, Shin-Etsu Silicone G-340, Shin-Etsu Silicone G-350, and Shin-Etsu Silicone G-630 (all of which are produced by Shin-Etsu Chemical Co., Ltd.); SH200, Molykote (registered trademark) SH33L, Molykote (registered trademark) 41, Molykote (registered trademark) 44, Molykote (registered trademark) 822M, Molykote (registered trademark) 111, Molykote (registered trademark) High-Vacuum Grease, and Molykote (registered trademark) Heat Diffusion Compound (all of which are produced by Toray Dow Corning Co., Ltd.); and the like. These silicone oils can be used singly or in combination of two or more.

Further, examples that can be provided as both fluorine oils and silicone oils include fluorosilicone oils, which are modified silicone oils having a fluoroalkyl group at the terminal or side chain thereof. Examples include the product name Unidyne (registered trademark) TG-5601, produced by Daikin Industries, Ltd.); Molykote (registered trademark) 3451 and Molykote (registered trademark) 3452 (both of which are produced by Toray Dow Corning Co., Ltd.); Shin-Etsu Silicone FL-5, Shin-Etsu Silicone X-22-821, Shin-Etsu Silicone X-22-822, and Shin-Etsu Silicone FL-100 (all of which are produced by Shin-Etsu Chemical Co., Ltd.); and the like. These oils can also be used singly or in combination of two or more.

All of the oils (particularly fluorine oils and silicone oils) described above, in which no hydrogen atom is bonded to a carbon atom or silicon atom in the main chain skeleton, can significantly improve stability and prevent discoloration due to deterioration over time to maintain flowability, and can be used as refrigeration oils for preventing the discoloration of heat transfer compositions containing an iodocarbon compound. Of these oils, fluorine oils are particularly preferable because they can suppress the reaction with the iodocarbon compound contained in the refrigerant to prevent the formation of co-refrigerants, such as $CHF_3$ (R23), as by-products, thereby improving the stability of the iodocarbon compound, and consequently significantly improving the stability of the entire heat transfer composition. In other words, the fluorine oils described above can also function as stabilizers for heat transfer compositions containing an iodocarbon compound.

As described above, the base oil of the refrigeration oil used in the present disclosure preferably has a higher content of the fluorine oil and/or silicone oil described above. Specifically, the content of the fluorine oil and/or silicone oil is preferably 50 mass % or more, and more preferably 70 mass % or more, based on the entire base oil in the refrigeration oil. For the same reason, it is more preferable that the content of the fluorine oil and/or silicone oil in the base oil of the refrigeration oil is 99.5 mass % or more based on the entire base oil in the refrigeration oil. Further, for the same reason, it is also preferable that the base oil in the refrigeration oil consists of the fluorine oil and/or silicone oil.

In the present disclosure, the refrigeration oil may further contain at least one additive in addition to the base oil. The additive may be at least one member selected from the group consisting of ultraviolet fluorescent dyes, stabilizers, antioxidants, extreme-pressure agents, acid scavengers, oxygen scavengers, copper deactivators, anticorrosive agents, oily agents, and antifoaming agents. Such various additives can be contained in an amount of 0 to 1 mass %, and preferably 1 ppm by mass to 0.1 mass %, based on the total amount of the refrigeration oil.

A refrigeration oil with a kinematic viscosity of 5 to 400 cSt at 40° C. is preferable from the standpoint of lubrication.

Heat Transfer Composition

The heat transfer composition 1 of the present disclosure comprises at least one iodocarbon compound and a refrigeration oil, as described above, and has a turbidity of 100 degrees or less as measured in accordance with JIS K0101 after stability testing. More specifically, when the heat transfer composition 1 of the present disclosure is allowed to stand at 175° C. and 3 MPa for 2 weeks after its production, the turbidity is preferably 100 degrees or less as measured in accordance with JIS K0101. This makes it possible to significantly improve stability, prevent discoloration due to deterioration over time to maintain flowability, and suppress the reaction with the iodocarbon compound contained in the refrigerant to prevent the formation of co-refrigerants, such as $CHF_3$ (R23), as by-products. For the same reason, the turbidity under the above conditions is preferably 50 degrees or less. A lower turbidity is more preferable. Although there is no preferable lower limit, the turbidity is generally 1 degree or more.

In the heat transfer composition 1 of the present disclosure, the refrigeration oil described above can be generally contained in an amount of 10 to 50 mass % based on the total amount of the heat transfer composition, which is taken as 100 mass %. However, a refrigeration oil-containing working fluid using the heat transfer composition 1 of the present disclosure varies in its formulation in a refrigeration cycle. Specifically, the refrigeration oil content of the refrigeration oil-containing working fluid using the heat transfer composition 1 of the present disclosure is relatively higher in a compressor, and is relatively lower in the period until it is discharged from the compressor in the form of mist, circulates in the refrigeration cycle, and returns to the compressor. For example, the refrigeration oil content of the refrigeration oil-containing working fluid using the heat transfer composition 1 of the present disclosure is 30 to 70 mass % in the compressor, and is preferably 0 to 10 mass %, and more preferably 1 ppm by mass to 20 mass %, in the period until it is discharged from the compressor and returns to the compressor.

The refrigeration oil-containing working fluid using the heat transfer composition 1 of the present disclosure may further contain at least one additive. Examples of additives include compatibilizing agents (e.g., polyoxyalkylene glycol ethers, amides, nitriles, ketones, chlorocarbons, esters, lactones, aryl ethers, fluoroethers, and 1,1,1-trifluoroalkanes). Such various additives can be contained in an amount of 0 to 1 mass %, and preferably 1 ppm by mass to 0.1 mass %, based on the total amount of the refrigeration oil-containing working fluid.

(1-2) Embodiment 2: Heat Transfer Composition 2

The heat transfer composition 2 of the present disclosure comprises at least one iodocarbon compound and a refrigeration oil in which no hydrogen atom is bonded to a carbon atom or silicon atom in the main chain skeleton. That is, the heat transfer composition 2 of the present disclosure comprises a refrigerant and a refrigeration oil, wherein the refrigerant is at least one iodocarbon compound, and in the refrigeration oil, no hydrogen atom is bonded to a carbon atom or silicon atom in the main chain skeleton. The heat transfer composition 2 of the present disclosure is suitable for commercial, industrial, and personal use, particularly as a heat transfer fluid for use in refrigeration systems and air-conditioning systems (including automobile air-conditioning systems), and can be used, for example, as a working fluid in a refrigerating machine. Specifically, the heat transfer composition 2 of the present disclosure can be obtained by mixing together a refrigerant or a refrigerant composition with a refrigeration oil used in a compressor of a refrigerating machine. Further, this composition is extremely stable in various applications and can be prevented from discoloration due to deterioration over time. In addition, this composition is non-flammable and tends to have a low global warming potential. This composition can be a particularly useful candidate as an alternative to CFC, HCFC, and HFC refrigerants.

Refrigerant

The refrigerant contained in the heat transfer composition 2 of the present disclosure comprises at least one iodocarbon compound, as described above.

As the iodocarbon compound, in the present disclosure, an iodocarbon compound with poor stability is used in combination with a refrigeration oil in which no hydrogen atom is bonded to a carbon atom or silicon atom in the main chain skeleton, thereby significantly improving stability and preventing discoloration due to deterioration over time. For this reason, the refrigerant component that has poor stability, a low global warming potential, and excellent non-flammability is preferably an iodofluorocarbon compound, more preferably a $C_{1-3}$ iodofluorocarbon compound, and most preferably trifluoroiodomethane ($CF_3I$).

Thus, the heat transfer composition 2 of the present disclosure comprises at least one iodocarbon compound as a refrigerant component, and may contain, if necessary, optional components, described later. The content of the iodocarbon compound is preferably 25 mass % or more, and more preferably 30 mass % or more, based on the entire refrigerant.

Optional Components

The heat transfer composition 2 of the present disclosure may optionally contain compounds generally used as heat transfer compositions, other than iodocarbon compounds, within a range in which the effects of the present disclosure are not impaired. Examples of such compounds include HFCs (particularly $C_{1-5}$ HFCs) and HFOs (particularly $C_{2-5}$ HFOs).

Examples of HFCs include difluoromethane (HFC-32), difluoroethane (e.g., 1,1-difluoroethane (HFC-152a) and 1,2-difluoroethane (HFC-152)), trifluoroethane (e.g., 1,1,1-trifluoroethane (HFC-143a) and 1,1,2-trifluoroethane (HFC-143)), tetrafluoroethane (e.g., 1,1,2,2-tetrafluoroethane (HFC-134) and 1,1,1,2-tetrafluoroethane (HFC-134a)), pentafluoroethane (HFC-125), pentafluoropropane (e.g., 1,1,1,3,3-pentafluoropropane (HFC-245fa)), hexafluoropropane (e.g., 1,1,1,3,3,3-hexafluoropropane (HFC-236fa) and 1,1,1,2,3,3-hexafluoropropane (HFC-236ea)), heptafluoropropane (1,1,1,2,3,3,3-heptafluoropropane (HFC-227ea)), pentafluorobutane, heptafluorocyclopentane, and the like. Of these, preferable as HFCs are HFC-32, HFC-152a, HFC-143a, HFC-134, HFC-134a, HFC-125, etc., and more preferable are HFC-32, HFC-152a, HFC-134a, HFC-125, etc., because they have little effect on the ozone layer and excellent refrigeration cycle characteristics. HFCs can be used singly or in combination of two or more.

Examples of HFOs include 2,3,3,3-tetrafluoropropene (HFO-1234yf), trans-1,2-difluoroethylene (HFO-1132(E)), cis-1,2-difluoroethylene (HFO-1132(Z)), trifluoroethylene (HFO-1123), 2-fluoropropene (HFO-1261yf), 1,1,2-trifluoropropene (HFO-1243yc), trans-1,2,3,3,3-pentafluoropropene (HFO-1225ye(E)), cis-1,2,3,3,3-pentafluoropropene (HFO-1225ye(Z)), trans-1,3,3,3-tetrafluoropropene (HFO-1234ze(E)), cis-1,3,3,3-tetrafluoropropene (HFO-1234ze(Z)), 3,3,3-trifluoropropene (HFO-1243zf), and the like.

In addition to the above optional components, as components that can be contained in a composition used to obtain a working fluid for a refrigerating machine generally by mixing them with a refrigeration oil, the heat transfer composition 2 of the present disclosure may also contain at least one member selected from the group consisting of water, tracers (e.g., FC-14 ($CF_4$), HCC-40 ($CH_3Cl$), HFC-23 ($CHF_3$), HFC-41 ($CH_3Cl$), HFC-161 ($CH_3CH_2F$), HCFC-22 ($CHClF_2$), HCFC-31 ($CH_2ClF$), CFC-1113 ($CF_2=CClF$), HFE-125 ($CF_3OCHF_2$), HFE-134a ($CF_3OCH_2F$), HFE-143a ($CF_3OCH_3$), HFE-227ea ($CF_3OCHFCF_3$), and HFE-236fa ($CF_3OCH_2CF_3$)), ultraviolet fluorescent dyes (e.g., naphthalimide, coumarin, anthracene, phenanthrene, xanthene, thioxanthene, naphthoxanthene, fluorescein, and derivatives thereof), stabilizers (e.g., nitromethane, nitroethane, nitrobenzene, nitrostyrene, 1,4-dioxane, 2,2,3,3,3-pentafluoropropylamine, diphenylamine, butylhydroxyxylene, and benzotriazole), polymerization inhibitors (e.g., 4-methoxy-1-naphthol, hydroquinone, hydroquinone methyl ether, dimethyl-t-butylphenol, 2,6-di-tert-butyl-p-cresol, and benzotriazole), and the like. Such various components can be contained in an amount of 0 to 1 mass %, and preferably 1 ppm by mass to 0.1 mass %, based on the total amount of the refrigerant component described above and these other components.

Refrigeration Oil

Regarding the refrigeration oil used in the present disclosure, when a double bond is introduced into the main chain skeleton by the reaction with the iodocarbon compound, the refrigeration oil becomes discolored, and the flowability is reduced. Thus, a refrigeration oil in which no hydrogen atom is bonded to a carbon atom or silicon atom in the main chain skeleton is used as the base oil.

As such a base oil, it is preferable to use, for example, a fluorine oil that does not have a structure represented by —$CH_2$—$CH_2$—, particularly a fluorine oil in which no hydrogen atom is bound to carbon atoms not only in the main chain skeleton but also at the main chain terminal. The use of such a fluorine oil can significantly improve stability, prevent discoloration due to deterioration over time to maintain flowability, and suppress the reaction with the iodocarbon compound contained in the refrigerant to prevent the formation of co-refrigerants, such as $CHF_3$ (R23), as by-products, thereby improving the stability of the iodocarbon compound, and consequently significantly improving the stability of the entire heat transfer composition.

This fluorine oil preferably contains fluorine atoms in an amount of 50 mol % or more, and more preferably 70 mol % or more, based on the total amount of fluorine atoms and hydrogen atoms, which is taken as 100 mol %, from the standpoint of significantly improving stability, preventing discoloration due to deterioration over time to maintain flowability, and suppressing the reaction with the iodocarbon compound contained in the refrigerant to prevent the formation of co-refrigerants, such as $CHF_3$ (R23), as by-products. It is also possible to set the fluoride atom content to 100 mol %.

Examples of fluorine oils that satisfy such conditions include a fluorine oil represented by formula (1):

$$R^2-(O-R^1)_n-R^3 \quad (1)$$

wherein $R^1$ is a fluorine-containing alkylene group, $R^2$ and $R^3$ are (fluoro)alkyl groups, and n is an integer of 1 to 500.

The fluorine-containing alkylene group represented by $R^1$ is preferably a perfluoroalkylene group, and more preferably a $C_{1-6}$ perfluoroalkylene group, from the standpoint of significantly improving stability, preventing discoloration due to deterioration over time to maintain flowability, and suppressing the reaction with the iodocarbon compound contained in the refrigerant to prevent the formation of co-refrigerants, such as $CHF_3$ (R23), as by-products.

Examples of such a fluorine-containing alkylene group include —($OCX_2$)—, —($OC_2X_4$)—, —($OC_3X_6$)—, —($OC_4X_8$)—, and the like. In the formulas, X are the same or different and each is a hydrogen atom or a fluorine atom. Further, it is preferable that 50% or more, preferably 70% or more, and more preferably 100%, of the total number of X contained in the fluorine oil is fluorine atoms. —($OC_2X_4$)— may be any of —($OCX_2CX_2$)— and —($OCX(CX_3)$)—; —($OC_3X_6$)— may be any of —($OCX_2CX_2CX_2$)—, —($OCX(CX_3)CX_2$)—, and —($OCX_2CX(CX_3)$)—; and —($OC_4X_8$)— may be any of —($OCX_2CX_2CX_2CX_2$)—, —($OCX(CX_3)CX_2CX_2$)—, —($OCX_2CX(CX_3)CX_2$)—, —($OCX_2CX_2CX(CX_3)$)—, —($OC(CX_3)_2CX_2$)—, —($OCX_2C(CX_3)_2$)—, —($OCX(CX_3)CX(CX_3)$)—, —($OCX(C_2X_5)CX_2$)—, and —($OCX_2CX(C_2X_5)$).

The (fluoro)alkyl groups represented by $R^2$ and $R^3$ refer to alkyl groups or fluoroalkyl groups. That is, $R^2$ and $R^3$ are alkyl groups optionally substituted with one or more fluoride atoms, and preferably $C_{1-16}$ alkyl groups optionally substituted with one or more fluoride atoms (particularly $C_{1-16}$ perfluoroalkyl groups). Further, $R^2$ and $R^3$ are more preferably each independently a $C_{1-3}$ perfluoroalkyl group.

In formula (1), n, which indicates the degree of polymerization, is not limited; however, from the standpoint of significantly improving stability, preventing discoloration due to deterioration over time to maintain flowability, and suppressing the reaction with the iodocarbon compound contained in the refrigerant to prevent the formation of co-refrigerants, such as $CHF_3$ (R23), as by-products, n is preferably an integer of 1 to 500, and more preferably an integer of 10 to 200.

Examples of fluorine oils that satisfy the above conditions include Daifloil #1, Daifloil #3, Daifloil #10, Daifloil #20, Daifloil #50, Daifloil #100, Demnum S-65, Daifloil Grease DG-203, Demnum L65, Demnum L100, and Demnum L200 (all of which are produced by Daikin Industries, Ltd.); Krytox (registered trademark) Grease 240AC (produced by DuPont); Sumitec F936 (produced by Sumico Lubricant Co., Ltd.); Molykote (registered trademark) HP-300, Molykote (registered trademark) HP-500, Molykote (registered trademark) HP-870, and Molykote (registered trademark) 6169 (all of which are produced by Toray Dow Corning Co., Ltd.); and the like. These fluorine oils can be used singly or in combination of two or more.

In addition, as the base oil of the refrigeration oil, a silicone oil having a —Si—O— skeleton in the main chain can also be preferably used. The use of such a silicone oil can improve stability and prevent discoloration due to deterioration over time to maintain flowability.

Examples of silicone oils that satisfy such conditions include a silicone oil represented by formula (2):

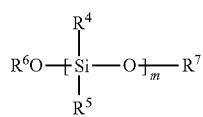

(2)

wherein $R^4$ and $R^5$ are the same or different and each is a hydrocarbon group, $R^6$ and $R^7$ are the same or different and each is a hydrogen atom or a hydrocarbon group, and m is an integer of 1 to 2000.

The hydrocarbon groups represented by $R^4$ to $R^7$ are preferably $C_{1-18}$ hydrocarbon groups, from the standpoint of significantly improving stability, preventing discoloration due to deterioration over time to maintain flowability, and suppressing the reaction with the iodocarbon compound contained in the refrigerant to prevent the formation of co-refrigerants, such as $CHF_3$ (R23), as by-products.

Examples of such hydrocarbon groups include $C_{1-18}$ alkyl groups, such as methyl, ethyl, propyl, butyl, pentyl, hexyl, heptyl, octyl, nonyl, decyl, dodecyl, tridecyl, tetradecyl, hexadecyl, and octadecyl; $C_{3-18}$ cycloalkyl groups, such as cyclohexyl; $C_{2-18}$ alkenyl groups, such as vinyl and allyl; $C_{6-18}$ aryl groups, such as phenyl and tolyl; $C_{7-18}$ aralkyl groups, such as styryl and α-methylstyryl; chloromethyl, 3-chloropropyl, 3,3,3-trifluoropropyl, cyanoethyl, 3-aminopropyl, and N-(β-aminoethyl)-γ-aminopropyl, in which some or all of hydrogen atoms bonded to the carbon atoms of the above groups are replaced with halogen atoms (fluorine, chlorine, bromine, or iodine), cyano groups, amino groups, hydroxyl groups, etc.; and the like. In particular, it is preferable that 80% or more, and particularly 90% or more, of the total number of $R^4$ to $R^7$ is methyl groups. The end of the silicone oil may be sealed with a triorganosilyl group or a diorganohydroxysilyl group.

In formula (2), m, which indicates the degree of polymerization, is not limited; however, from the standpoint of significantly improving stability, preventing discoloration due to deterioration over time to maintain flowability, and suppressing the reaction with the iodocarbon compound contained in the refrigerant to prevent the formation of co-refrigerants, such as $CHF_3$ (R23), as by-products, n is preferably an integer of 1 to 2000, and more preferably an integer of 1 to 1000.

Examples of silicone oils that satisfy the above conditions include the product name ASO-100 (produced by AS ONE Corporation); the product names Shin-Etsu Silicone KF-96, Shin-Etsu Silicone KF-965, Shin-Etsu Silicone KF-968, Shin-Etsu Silicone KF-99, Shin-Etsu Silicone KF-50, Shin-Etsu Silicone KF-54, Shin-Etsu Silicone HIVAC F-4, Shin-Etsu Silicone HIVAC F-5, Shin-Etsu Silicone KF-56A, and Shin-Etsu Silicone KF-995, the product names Shin-Etsu Silicone G-30 series, Shin-Etsu Silicone G-40 series, Shin-Etsu Silicone FG-720 series, Shin-Etsu Silicone G-411, Shin-Etsu Silicone G-501, Shin-Etsu Silicone G-6500, Shin-Etsu Silicone G-330, Shin-Etsu Silicone G-340, Shin-Etsu Silicone G-350, and Shin-Etsu Silicone G-630 (all of which are produced by Shin-Etsu Chemical Co., Ltd.); SH200, Molykote (registered trademark) SH33L, Molykote (registered trademark) 41, Molykote (registered trademark) 44, Molykote (registered trademark) 822M, Molykote (registered trademark) 111, Molykote (registered trademark) High-Vacuum Grease, and Molykote (registered trademark) Heat Diffusion Compound (all of which are produced by Toray Dow Corning Co., Ltd.); and the like. These silicone oils can be used singly or in combination of two or more.

Further, examples that can be provided as both fluorine oils and silicone oils include fluorosilicone oils, which are modified silicone oils having a fluoroalkyl group at the terminal or side chain thereof. Examples include the product name Unidyne (registered trademark) TG-5601, produced by Daikin Industries, Ltd.); Molykote (registered trademark) 3451 and Molykote (registered trademark) 3452 (both of which are produced by Toray Dow Corning Co., Ltd.); Shin-Etsu Silicone FL-5, Shin-Etsu Silicone X-22-821, Shin-Etsu Silicone X-22-822, and Shin-Etsu Silicone FL-100 (all of which are produced by Shin-Etsu Chemical Co., Ltd.); and the like. These oils can also be used singly or in combination of two or more.

All of the oils (particularly fluorine oils and silicone oils) described above, in which no hydrogen atom is bonded to a carbon atom or silicon atom in the main chain skeleton, can significantly improve stability and prevent discoloration due to deterioration over time to maintain flowability, and can be used as refrigeration oils for preventing the discoloration of heat transfer compositions containing an iodocarbon compound. Of these oils, fluorine oils are particularly preferable because they can suppress the reaction with the iodocarbon compound contained in the refrigerant to prevent the formation of co-refrigerants, such as $CHF_3$ (R23), as by-products, thereby improving the stability of the iodocarbon compound, and consequently significantly improving the stability of the entire heat transfer composition. In other words, the fluorine oils described above can also function as stabilizers for heat transfer compositions containing an iodocarbon compound.

As described above, the base oil of the refrigeration oil used in the present disclosure preferably has a higher content of the fluorine oil and/or silicone oil described above. Specifically, the content of the fluorine oil and/or silicone oil is preferably 50 mass % or more, and more preferably 70 mass % or more, based on the entire base oil in the refrigeration oil. For the same reason, it is more preferable that the content of the fluorine oil and/or silicone oil in the base oil of the refrigeration oil is 99.5 mass % or more based on the entire base oil in the refrigeration oil. Further, for the same reason, it is also preferable that the base oil in the refrigeration oil consists of the fluorine oil and/or silicone oil.

In the present disclosure, the refrigeration oil may further contain at least one additive in addition to the base oil. The additive may be at least one member selected from the group consisting of ultraviolet fluorescent dyes, stabilizers, antioxidants, extreme-pressure agents, acid scavengers, oxygen scavengers, copper deactivators, anticorrosive agents, oily agents, and antifoaming agents. Such various additives can be contained in an amount of 0 to 1 mass %, and preferably 1 ppm by mass to 0.1 mass %, based on the total amount of the refrigeration oil.

A refrigeration oil with a kinematic viscosity of 5 to 400 cSt at 40° C. is preferable from the standpoint of lubrication.

Heat Transfer Composition

The heat transfer composition 2 of the present disclosure comprises at least one iodocarbon compound and a refrigeration oil in which no hydrogen atom is bonded to a carbon atom or silicon atom in the main chain skeleton, as described above.

In the heat transfer composition 2 of the present disclosure, the refrigeration oil described above can be generally contained in an amount of 10 to 50 mass % based on the total amount of the heat transfer composition, which is taken as 100 mass %. However, a refrigeration oil-containing working fluid using the heat transfer composition 2 of the present disclosure varies in its formulation in a refrigeration cycle. Specifically, the refrigeration oil content of the refrigeration oil-containing working fluid using the heat transfer composition 2 of the present disclosure is relatively higher in a compressor, and is relatively lower in the period until it is discharged from the compressor in the form of mist, circulates in the refrigeration cycle, and returns to the compressor. For example, the refrigeration oil content of the refrigeration oil-containing working fluid using the heat transfer composition 2 of the present disclosure is 30 to 70 mass % in the compressor, and is preferably 0 to 10 mass %, and more preferably 1 ppm by mass to 20 mass %, in the period until it is discharged from the compressor and returns to the compressor.

The refrigeration oil-containing working fluid using the heat transfer composition 2 of the present disclosure may further contain at least one additive. Examples of additives include compatibilizing agents (e.g., polyoxyalkylene glycol ethers, amides, nitriles, ketones, chlorocarbons, esters, lactones, aryl ethers, fluoroethers, and 1,1,1-trifluoroalkanes). Such various additives can be contained in an amount of 0 to 1 mass %, and preferably 1 ppm by mass to 0.1 mass %, based on the total amount of the refrigeration oil-containing working fluid.

2. Refrigerating Machine and Operation Method Thereof

The refrigerating machine of the present disclosure comprises the heat transfer composition 1 or 2 of the present disclosure as a working fluid, and the method for operating a refrigerating machine of the present disclosure is a method for operating a refrigerating machine using the heat transfer composition 1 or 2 of the present disclosure.

Specifically, the method for operating a refrigerating machine of the present disclosure comprises circulating the heat transfer composition 1 or 2 in a refrigerating machine.

Although the embodiments are described above, it will be understood that various changes in form and details can be made without departing from the spirit and scope of the claims.

EXAMPLES

The present disclosure is described in more detail below with reference to Examples. However, the present disclosure is not limited to the Examples.

Turbidity Measurement

The turbidity of refrigeration oils after stability testing (allowed to stand at 175° C. at 3 MPa for 2 weeks) was measured in accordance with JIS K0101 using a turbidity meter (TR-55, produced by Kasahara Chemical Instruments Corp.).

Example 1: $CF_3I$+Fluorine Oil 50 parts by mass of trifluoroiodomethane ($CF_3I$) and 50 parts by mass of fluorine oil (Demnum S-20, produced by Daikin Industries, Ltd.; fluorination degree: 100 mol %) were mixed. The resulting mixture (heat transfer composition) was placed in a glass tube together with metal pieces of iron, copper, and aluminum, and the glass tube was sealed. The sealed glass tube was allowed to stand for 2 weeks while being maintained at 175° C. and 3 MPa. After 2 weeks, the mixture in the glass tube was observed.

As a result of visual observation, the heat transfer composition was colorless and transparent even after 2 weeks, and had excellent flowability. It can be thus understood that the heat transfer composition was excellent in stability. Further turbidity measurement revealed that the obtained turbidity was 20 degrees. In addition, when the formation of $CHF_3$ (R23) was evaluated by gas analysis, $CHF_3$ (R23) was not detected. It can be thus understood that $CF_3I$, which was a refrigerant component, did not react with the fluorine oil, which was a refrigeration oil.

Example 2: $CF_3I$+Fluorine Oil 50 parts by mass of trifluoroiodomethane ($CF_3I$) and 50 parts by mass of fluorine oil obtained by adjusting the fluorination degree of Demnum S-20 to 50 mol % were mixed. The resulting mixture (heat transfer composition) was placed in a glass tube together with metal pieces of iron, copper, and aluminum, and the glass tube was sealed. The fluorination degree was calculated by NMR measurement as follows: fluorination degree=100×number of fluorine atoms/ (number of fluorine atoms+number of hydrogen atoms). The sealed glass tube was allowed to stand for 2 weeks while being maintained at 175° C. and 3 MPa. After 2 weeks, the mixture in the glass tube was observed.

As a result of visual observation, the heat transfer composition was colorless and transparent even after 2 weeks, and had excellent flowability. It can be thus understood that the heat transfer composition was excellent in stability. Further turbidity measurement revealed that the obtained turbidity was 20 degrees. In addition, when the formation of $CHF_3$ (R23) was evaluated by gas analysis, $CHF_3$ (R23) was not detected. It can be thus understood that $CF_3I$, which was a refrigerant component, did not react with the fluorine oil, which was a refrigeration oil.

Example 3: $CF_3I$+Fluorine Oil 50 parts by mass of trifluoroiodomethane ($CF_3I$) and 50 parts by mass of fluorine oil obtained by adjusting the fluorination degree of Demnum S-20 to 70 mol % were mixed. The resulting mixture (heat transfer composition) was placed in a glass tube together with metal pieces of iron, copper, and aluminum, and the glass tube was sealed. The fluorination degree was calculated by NMR measurement as follows: fluorination degree=100×number of fluorine atoms/(number of fluorine atoms+number of hydrogen atoms). The sealed glass tube was allowed to stand for 2 weeks while being maintained at 175° C. and 3 MPa. After 2 weeks, the mixture in the glass tube was observed.

As a result of visual observation, the heat transfer composition was colorless and transparent even after 2 weeks, and had excellent flowability. It can be thus understood that the heat transfer composition was excellent in stability. Further turbidity measurement revealed that the obtained turbidity was 20 degrees. In addition, when the formation of $CHF_3$ (R23) was evaluated by gas analysis, $CHF_3$ (R23) was not detected. It can be thus understood that $CF_3I$, which was a refrigerant component, did not react with the fluorine oil, which was a refrigeration oil.

Example 4: $CF_3I$+Silicone Oil

An experiment was carried out in the same manner as in Example 1, except that a silicone oil (ASO-100, produced by AS ONE Corporation) was used in place of the fluorine oil.

As a result of visual observation, the heat transfer composition was colorless and transparent even after 2 weeks, and had excellent flowability. It can be thus understood that the heat transfer composition was excellent in stability. Further turbidity measurement revealed that the obtained turbidity was 10 degrees.

Comparative Example 1: $CF_3I$+Polyvinyl Ether

An experiment was carried out in the same manner as in Example 1, except that polyvinyl ether (FVC32D, produced by Idemitsu Kosan Co., Ltd.) was used in place of the fluorine oil.

As a result of visual observation, the heat transfer composition turned black after 2 weeks, and had no flowability. It can be thus understood that the heat transfer composition was inferior in stability. Further turbidity measurement revealed that the obtained turbidity was greater than 100 degrees.

Comparative Example 2: $CF_3I$+Polyalkylene Glycol

An experiment was carried out in the same manner as in Example 1, except that polyalkylene glycol (SUNICE P56, produced by Japan Sun Oil Company, Ltd.) was used in place of the fluorine oil.

As a result of visual observation, the heat transfer composition turned black after 2 weeks, and had no flowability. It can be thus understood that the heat transfer composition was inferior in stability. Further turbidity measurement revealed that the obtained turbidity was greater than 100 degrees.

Comparative Example 3: $CF_3I$+Polyalkylene Glycol+Isoprene

Polyalkylene glycol (SUNICE P56, produced by Japan Sun Oil Company, Ltd.) was used in place of the fluorine oil, and isoprene (produced by Wako Pure Chemical Corporation) was used as an additive. That is, an experiment was carried out in the same manner as in Example 1, except that 49 parts by mass of trifluoroiodomethane ($CF_3I$), 49 parts by mass of polyalkylene glycol, and 2 parts by mass of isoprene were used.

As a result of visual observation, the heat transfer composition turned black after 2 weeks, and had no flowability. It can be thus understood that the addition of isoprene, which was the diene-based compound disclosed in PTL 1, was not effective to improve stability, and that the stability was inferior. Further turbidity measurement revealed that the obtained turbidity was greater than 100 degrees.

The invention claimed is:

1. A heat transfer composition comprising:
(i) at least one $C_{1-3}$ iodofluorocarbon compound; and
(ii) a refrigeration oil;
wherein the refrigerant oil comprises a base oil, and the base oil comprises 50 mass % or more of (ii-a) a fluorine oil and/or (ii-b) a silicone oil in which no hydrogen atom is bonded to a carbon atom or a silicon atom in a main chain skeleton,
wherein (ii-a) the fluorine oil does not have a structure represented by —$CH_2$—$CH_2$—, and
wherein (ii-a) the fluorine oil is represented by formula (1):

wherein $R^1$ is a fluorine-containing alkylene group, $R^2$ and $R^3$ are (fluoro)alkyl groups, and n is an integer of 10 to 200, and
wherein a kinematic viscosity of (ii-a) the fluorine oil is 5 to 400 cSt at 40° C.

2. The heat transfer composition according to claim 1, wherein the base oil comprises (ii-a) the fluorine oil, and (ii-a) the fluorine oil contains fluorine atoms in an amount of 50 mol % or more based on the total amount of fluorine atoms and hydrogen atoms in (ii-a) the fluorine oil, which is taken as 100 mol %.

3. The heat transfer composition according to claim 1, wherein the base oil comprises (ii-a) the fluorine oil, and in (ii-a) the fluorine oil, no hydrogen atom is bonded to a carbon atom in a main chain skeleton and at a main chain terminal.

4. The heat transfer composition according claim 1, wherein the base oil comprises (ii-b) the silicone oil, and (ii-b) the silicone oil has a —Si—O— skeleton in its main chain.

5. The heat transfer composition according to claim 1, wherein the at least one $C_{1-3}$ iodofluorocarbon compound comprises trifluoroiodomethane.

6. The heat transfer composition according to claim 1, wherein the refrigeration oil is contained in an amount of 10 to 50 mass % based on the total amount of the heat transfer composition, which is taken as 100 mass %.

7. The heat transfer composition according to claim 1 for use as a working fluid for a refrigerating machine.

8. A refrigerating machine comprising the heat transfer composition according to claim 1 as a working fluid.

9. A method for operating a refrigerating machine, comprising circulating the heat transfer composition according to claim 1 as a working fluid in a refrigerating machine.

* * * * *